(12) United States Patent
Kern

(10) Patent No.: US 8,229,815 B1
(45) Date of Patent: Jul. 24, 2012

(54) TRANSACTION RANGE COMPARISON FOR FINANCIAL INVESTIGATION

(75) Inventor: Daniel C. Kern, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 446 days.

(21) Appl. No.: 11/680,902

(22) Filed: Mar. 1, 2007

(51) Int. Cl.
*G06Q 40/00* (2006.01)

(52) U.S. Cl. ............... 705/35; 705/36; 705/39; 705/40; 705/42

(58) Field of Classification Search .................. 705/35, 705/36, 39, 40, 42
See application file for complete search history.

(56) References Cited

U.S. PATENT DOCUMENTS

| | | | |
|---|---|---|---|
| 2003/0028502 A1* | 2/2003 | Lambert et al. | 707/1 |
| 2003/0033228 A1* | 2/2003 | Bosworth-Davies et al. | 705/35 |
| 2004/0177035 A1* | 9/2004 | Silva | 705/39 |
| 2005/0091524 A1* | 4/2005 | Abe et al. | 713/200 |
| 2005/0171898 A1* | 8/2005 | Bishop et al. | 705/39 |
| 2006/0047593 A1* | 3/2006 | Naratil et al. | 705/35 |
| 2007/0250441 A1* | 10/2007 | Paulsen et al. | 705/39 |
| 2008/0010203 A1* | 1/2008 | Grant | 705/44 |

* cited by examiner

*Primary Examiner* — Nga B. Nguyen
(74) *Attorney, Agent, or Firm* — Banner & Witcoff, Ltd.; Michael A. Springs

(57) ABSTRACT

Systems and methods for determining the likelihood that a group of transactions may be structured to avoid a limit or reporting requirement, such as a government reporting requirement, are disclosed. The frequency distributions of a customer's transactions for different value ranges are compared to determine whether transactions within a target range occur randomly or at an unexpected level. In another embodiment, the frequency distribution of a customer's transactions is compared to a frequency distribution created by randomly sampling a distribution of similar transactions to determine whether the customer's transactions occur randomly.

13 Claims, 5 Drawing Sheets

| X | # of weeks with X transactions within a lower range | # of weeks with X transactions within a target range | # of weeks with X transactions within an upper range |
|---|---|---|---|
| 0 | 0 | 0 | 50 |
| 1 | 0 | 8 | 0 |
| 2 | 0 | 4 | 1 |
| 3 | 4 | 18 | 0 |
| 4 | 7 | 36 | 0 |
| ... | | | |

Figure 5

TRANSACTION RANGE COMPARISON FOR FINANCIAL INVESTIGATION

FIELD OF THE INVENTION

Embodiments of the present invention relate to systems and methods that are utilized to identify transactions that are potentially related to financial misconduct. More particularly, embodiments of the invention provide mechanisms for determining whether a group of transactions are likely random or structured to circumvent government reporting requirements.

DESCRIPTION OF THE RELATED ART

Financial institutions monitor customer transactions in an effort to identify money laundering activities. Money Laundering is the practice of filtering the proceeds of illegitimate activity through a series of seemingly legitimate transactions to conceal or obscure the illegitimate origin of the funds involved in the transactions. One method of money laundering involves structuring transactions to avoid government reporting requirements. Currently in the United States, transactions that involve more than $10,000 in currency, i.e., cash must be reported to the government. Structuring occurs, for example, when a financial institution customer makes multiple withdrawals or deposits that are each below the reporting threshold, but when combined, exceed the reporting threshold. For example, a person who wishes to deposit $13,000 cash may make a first deposit of $8,000 and a second deposit of $5,000 in an attempt to avoid the reporting requirements.

Financial institutions report transactions that appear to be of a suspicious nature to investigatory entities. The amount of time and resources expended by financial institutions and investigatory entities can be considerable because it is often difficult and time consuming to review raw financial data and accurately determine whether or not a customer is structuring transactions to avoid government reporting requirements.

Therefore, there exists a need in the art for systems and methods that assist financial institutions in determining whether or not transactions are potentially related to money laundering activities.

SUMMARY OF THE INVENTION

Aspects of the invention overcome at least some of the problems and limitations of the prior art by providing systems and methods that may be used to determine the likelihood that a group of transactions are structured to avoid government reporting requirements. In a first embodiment, transaction activity data are sampled to create a frequency distribution that is compared to a customer's transaction data within a target range to determine whether the customer's transactions occur randomly. In another embodiment, the distribution of a customer's transactions among different value ranges are compared to determine whether transactions within the target range occur at a random or higher rate.

Of course, the methods and systems disclosed herein may also include other additional elements, steps, computer-executable instructions, or computer-readable data structures. The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein:

FIG. 5 illustrates a table of frequency distributions within a target range and two adjacent ranges, in accordance with an embodiment of the invention.

DETAILED DESCRIPTION

Aspects of the present invention are preferably implemented with computer devices and computer networks that allow users to exchange and process financial transaction data. Each computer device may include a variety of conventional hardware and software components. Exemplary components include: magnetic memory modules, physical memory modules, a network card, a modem, a central processor that controls the overall operation of the computer and a system bus that connects the central processor to one or more conventional hardware components. Each computer device may also include a variety of interface units and drives for reading and writing data or files. Depending on the type of computer device, a user can interact with the computer with a keyboard, pointing device, microphone, pen device or other input device. The operations of computer devices may be controlled by computer-executable instructions stored on computer-readable medium.

Figure 1:
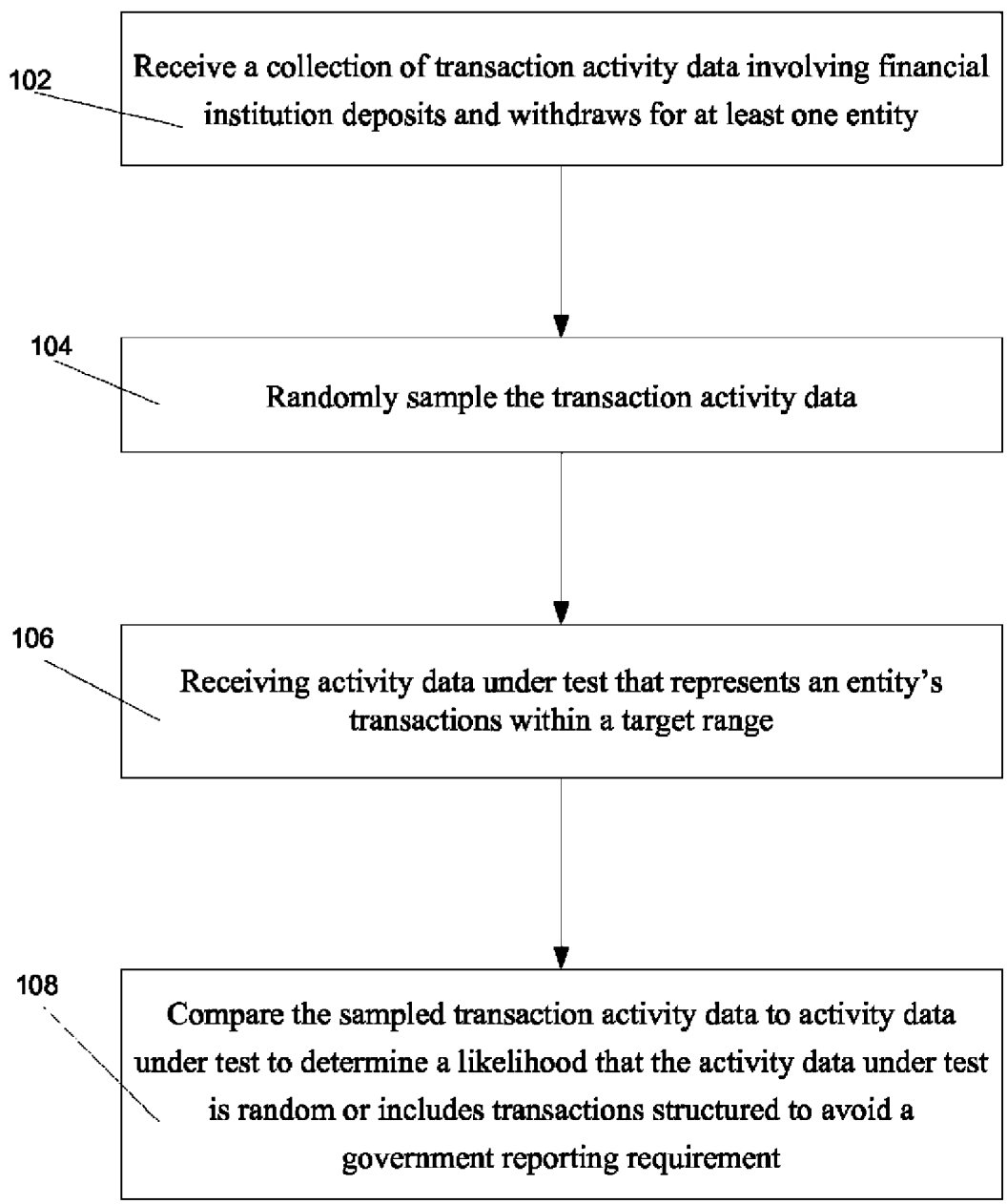
FIG. 1 illustrates a method of determining the likelihood that a group of financial transactions are structured to avoid a limit or reporting requirement, such as a government reporting requirement, in accordance with an embodiment of the invention.

FIG. 1 illustrates a method of determining the likelihood that a group of financial transactions are structured to avoid a limit or reporting requirement, such as a government reporting requirement, in accordance with an embodiment of the invention. First, in step 102 a collection of transaction activity data is collected for at least one entity. The transaction activity data may include deposit and withdrawal activity at a financial institution over a predetermined period of time, such as a year.

In step 104 the transaction activity data is randomly sampled. Step 104 may be performed to create a distribution of data that may be used later. In one embodiment, sampled data is created by simulating a set of weeks of random activity by sampling the raw transaction data a large number of times. A group of synthetic weeks may be created by grouping together seven days selected at random. The process may be repeated until enough synthetic weeks are created to cover a predetermined time period.

Activity data under test that represents an entity's is received in step 106. The activity data under test may include an entity's deposit and withdrawal activity at a financial institution over a predetermined period of time, such as a year.

Figure 2:
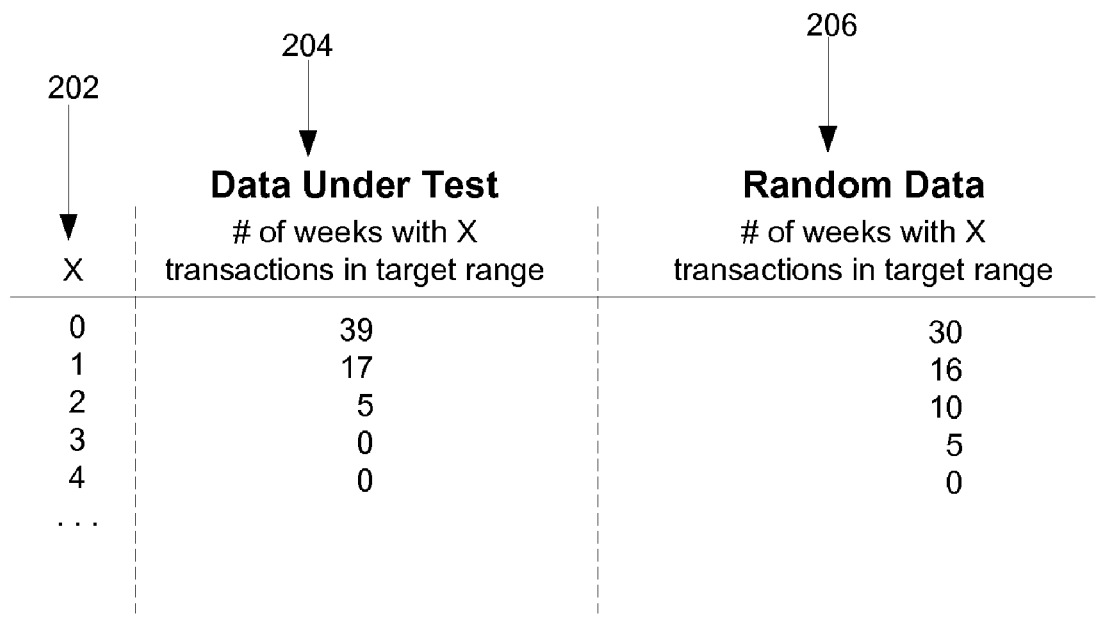
FIG. 2 shows a table that compares data under test to randomly sampled data, in accordance with an embodiment of the invention.

Next, in step 108 the sampled transaction activity data is compared to activity data under test to determine the likelihood that the activity data under test is random or includes transactions structured to avoid a limit or reporting requirement, such as a government reporting requirement. FIG. 2 shows a table that compares data under test to data created through the random sampling of data. In the embodiment shown, column 202 includes a number of transactions. Column 204 shows the number of weeks that the data under test has the indicated number of transactions within a target range. For example, column 204 indicates that there were 39 weeks in which 0 transactions occurred within the target range and there were 17 weeks in which 1 transaction occurred within the target range. Column 206 shows the number of synthetic weeks for which the data includes the indicated number of transactions within the target range. The data shown in column 206 may have been or can be normalized by dividing the relevant counts by the number entities. Column 206 shows that there were 30 synthetic weeks in which 0 transactions occurred within the target range and 16 synthetic weeks in which 1 transaction occurred within the target range.

In one implementation of step 108, statistical analysis may be performed to determine whether the frequency distribution shown in column 204 is statistically different from the frequency distribution shown in column 206. Those skilled in the art will appreciate that a number of statistical procedures may be performed to indicate this difference. In one embodiment, a Chi-square goodness-of-fit test is utilized. Chi-square goodness-of-fit tests are well known to those skilled in the art. When the results of the chi-square goodness-of-fit test exceeds a referenced, predetermined value, the distributions in columns 204 and 206 are considered to be significantly different, which suggests that transactions are not occurring randomly and may be an indication that the transactions are being structured to avoid a limit or reporting requirement, such as a government reporting requirement.

Figure 3:
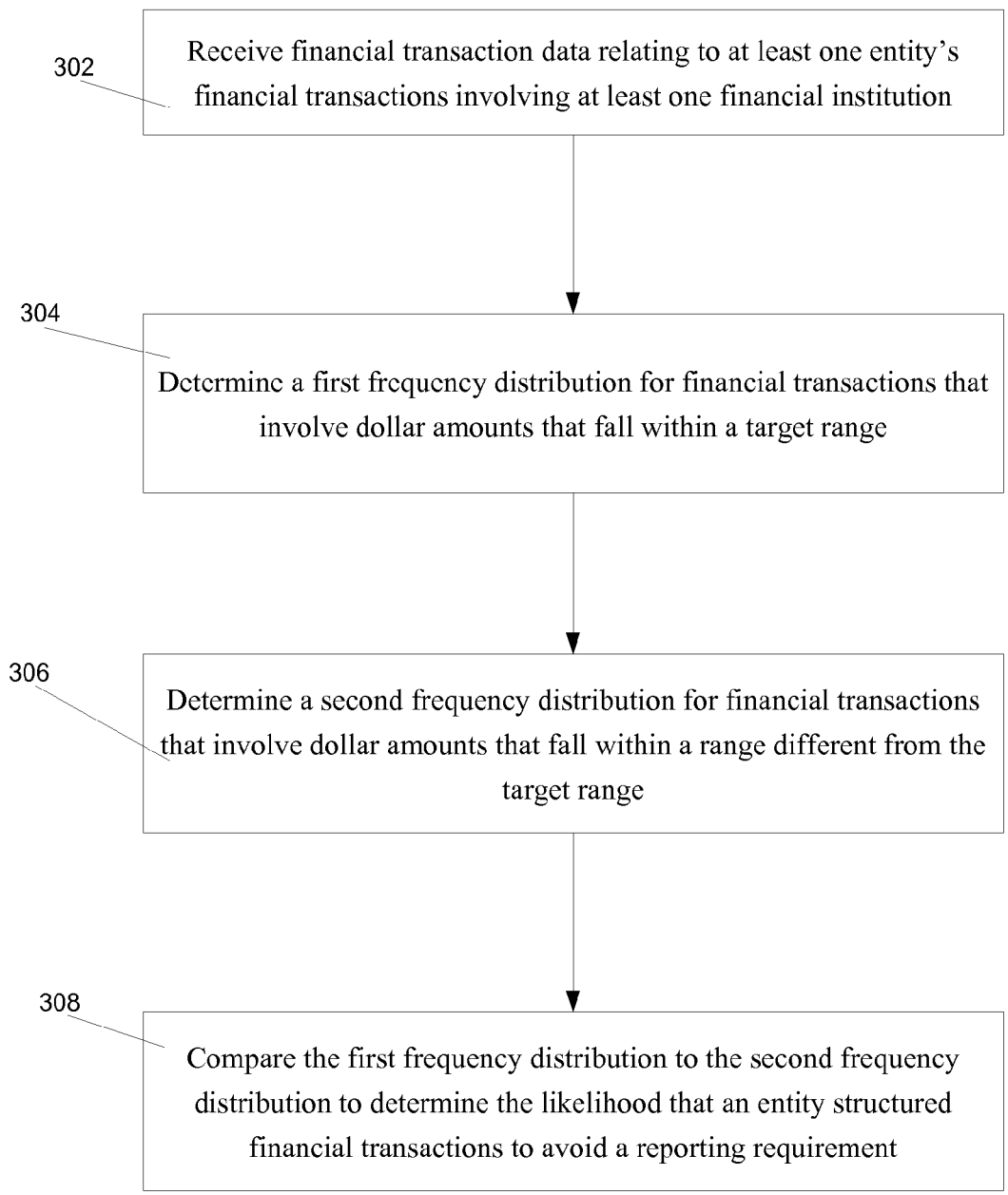
FIG. 3 illustrates an alternative method that may be used to determine the likelihood that an entity may be structuring financial transactions to avoid a limit or reporting requirement, in accordance with an embodiment of the invention.

FIG. 3 illustrates an alternative method that may be used to determine the likelihood that an entity may be structuring financial transactions to avoid a limit or reporting requirement, such as a government reporting requirement, in accordance with an embodiment of the invention. First, in step 302 financial transaction data relating to at least one entity's financial transactions involving at least one financial institution is received. Step 302 may include receiving data describing all of the deposits and withdrawals for a customer of a financial institution. In various alternative embodiments, the transactions of more than one entity, such as a group of members of the same household, may be used when performing the analysis. Moreover, the data for transactions involving more than one financial institution may also be combined when performing the analysis. Multiple entities and financial institutions may be used when trying to locate complex money laundering schemes.

Figure 4:
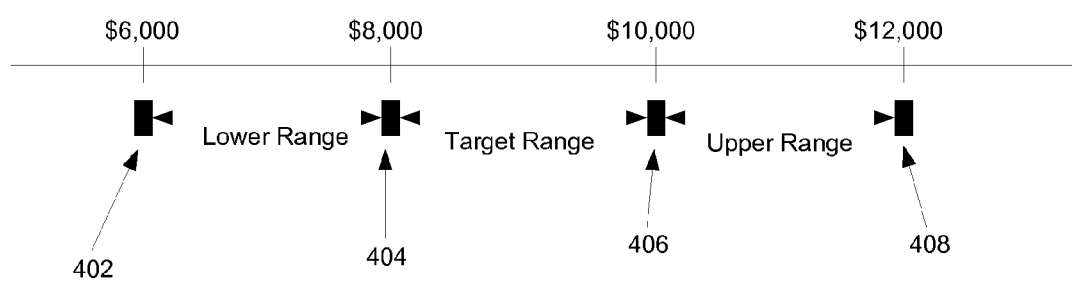
FIG. 4 illustrates an exemplary user interface that may be used to set target and adjacent ranges, in accordance with an embodiment of the invention.

Next, in step 304 a frequency distribution for financial transactions that involve dollar amounts that fall within a target range is determined FIG. 4 illustrates an exemplary user interface that may be used to set ranges that are used with the method shown in FIG. 3. Icons 402, 404, 406 and 408 are moveable along a horizontal axis parallel to the scale showing dollar amounts. In one embodiment, the government requires transactions that involve more than $10,000 cash be reported. A target range may correspond to the values between $8,000 and $10,000. Of course, the user may slide icon 404 to the left or to the right to adjust the lower end of the target range. Icon 406 may be moved to the left or right to adjust the upper end of the target range.

An upper range and/or a lower range may be defined to facilitate determining whether or not transactions that fall within the target range occur at an expected level (or volume). In the embodiment shown, icon 408 is adjusted to $12,000 to create an upper range between $10,000 and $12,000. Similarly, a lower range is established between $6,000 and $8,000.

One skilled in the art will appreciate that a variety of different user interface elements and other mechanisms may be used to establish the range values shown in FIG. 4. For example, a user interface may include text blocks that allow a user to directly enter the values. In one particular embodiment, the values entered directly into a spreadsheet document.

Returning to FIG. 3, in step 306 a second frequency distribution for financial transactions that involve dollar amounts that fall within a different range is determined. In one embodiment, the range is adjacent to the target range. FIG. 5 illustrates a table of frequency distributions within a target range and two adjacent ranges, in accordance with an embodiment of the invention. A first column 502 indicates a number of transactions. Column 504 shows the number of weeks with the indicated number of transactions that occur in the lower range. An exemplary lower range includes transactions having values between $6,000 and $8,000. Column 506 shows the number of weeks having the indicated number of transactions within the target range. An exemplary target range includes transactions having values between $8,000 and $10,000. Column 506 shows, for example, that there were 8 weeks with 1 transaction in the target range. Column 508 shows the number of weeks having the indicated number of transactions within an upper range. An exemplary upper range includes transactions having values between $10,000 and $12,000. Column 508, for example, shows that there were 50 weeks with 0 transactions in the upper range.

Again returning to FIG. 3, finally in step 308 the first frequency distribution is compared to the second frequency distribution to determine the likelihood that an entity structured financial transactions to avoid a reporting requirement. The reporting requirement may be a government reporting requirement. In alternative embodiments, multiple frequency distributions are used in the comparison. For example, the frequency distribution of transactions that fall within a target range may be compared to 2, 3 or 4 frequency distributions for transactions that fall within other ranges.

One skilled in the art will appreciate that the methods shown in FIGS. 1 and 3 may be combined. In one embodiment, a single software tool may be configured to implement both of the illustrated methods or allow a user to choose which method to implement.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims. All are considered within the sphere, spirit, and scope of the invention.

I claim:

1. An apparatus for determining that a group of transactions may be structured to avoid a predetermined reporting requirement, the apparatus comprising:
   a memory; and
   a processor configured to retrieve computer-executable instructions from the memory and to perform:
   receiving a collection of transaction activity data involving financial institution transactions;
   sampling the transaction activity data over a synthesized period of time by randomly grouping together component periods of time included in the synthesized period of time;
   receiving unsampled activity data under test that represents transactions for a first financial entity and for a second financial entity;

combining the unsampled activity data for the first financial entity and the second financial entity;

comparing the sampled transaction activity data to the combined unsampled activity data under test to determine a likelihood that the unsampled activity data under test is occurring randomly; and based on the likelihood, determining whether a group of transactions for different individuals and for the first financial entity and the second financial entity is structured to avoid a predetermined reporting requirement.

2. The apparatus of claim 1, wherein the synthesized period of time comprises a set of weeks.

3. The apparatus of claim 1, wherein the collection of transaction activity data comprises raw transaction data for customers of a financial institution.

4. The apparatus of claim 2, wherein the sampling comprises sampling raw transaction data a number of times to create simulated transaction activity for the set of weeks.

5. The apparatus of claim 1, wherein the comparing comprises performing statistical analysis to compare a frequency distribution of the sampled transaction activity data to a frequency distribution of the unsampled activity data under test.

6. The apparatus of claim 5, wherein the comparing comprises performing a chi-square goodness-of-fit test.

7. The apparatus of claim 1, wherein the different individuals comprise people who live in the same household.

8. The apparatus of claim 1, wherein the unsampled activity data under test comprises financial data from more than one financial institution and wherein the processor further performs combining the financial data from the more than one financial institution.

9. The apparatus of claim 1, wherein the predetermined reporting requirement comprises a government reporting requirement that requires the reporting of deposits and withdrawals exceeding a predetermined value.

10. A computer-readable medium containing computer-executable instructions for causing a computer device to perform the steps comprising:

providing a collection of transaction activity data involving financial institution deposits and withdrawals;

sampling the transaction activity data over a synthesized period of time by randomly grouping together component periods of time included in the synthesized period of time;

combining unsampled activity for activity for a first financial entity and a second financial entity;

comparing the sampled transaction activity data to the combined unsampled activity data under test to determine a likelihood that the unsampled activity data under test is occurring randomly; and based on the likelihood, determining whether a group of transactions for different individuals and for the first financial entity and the second financial entity is structured to avoid a government reporting requirement.

11. A computer-readable medium of claim 10, the computer-executable instructions further causing the computer device to perform:

performing a statistical analysis to compare a frequency distribution of the sampled transaction activity data to a frequency distribution of the unsampled activity data under test.

12. A computer-readable medium of claim 11, the computer-executable instructions further causing the computer device to perform:

performing a chi-square goodness-of-fit test.

13. A computer-readable medium of claim 11, the computer-executable instructions further causing the computer device to perform:

combining financial data from more than one financial institution.

\* \* \* \* \*